United States Patent Office 3,694,290
Patented Sept. 26, 1972

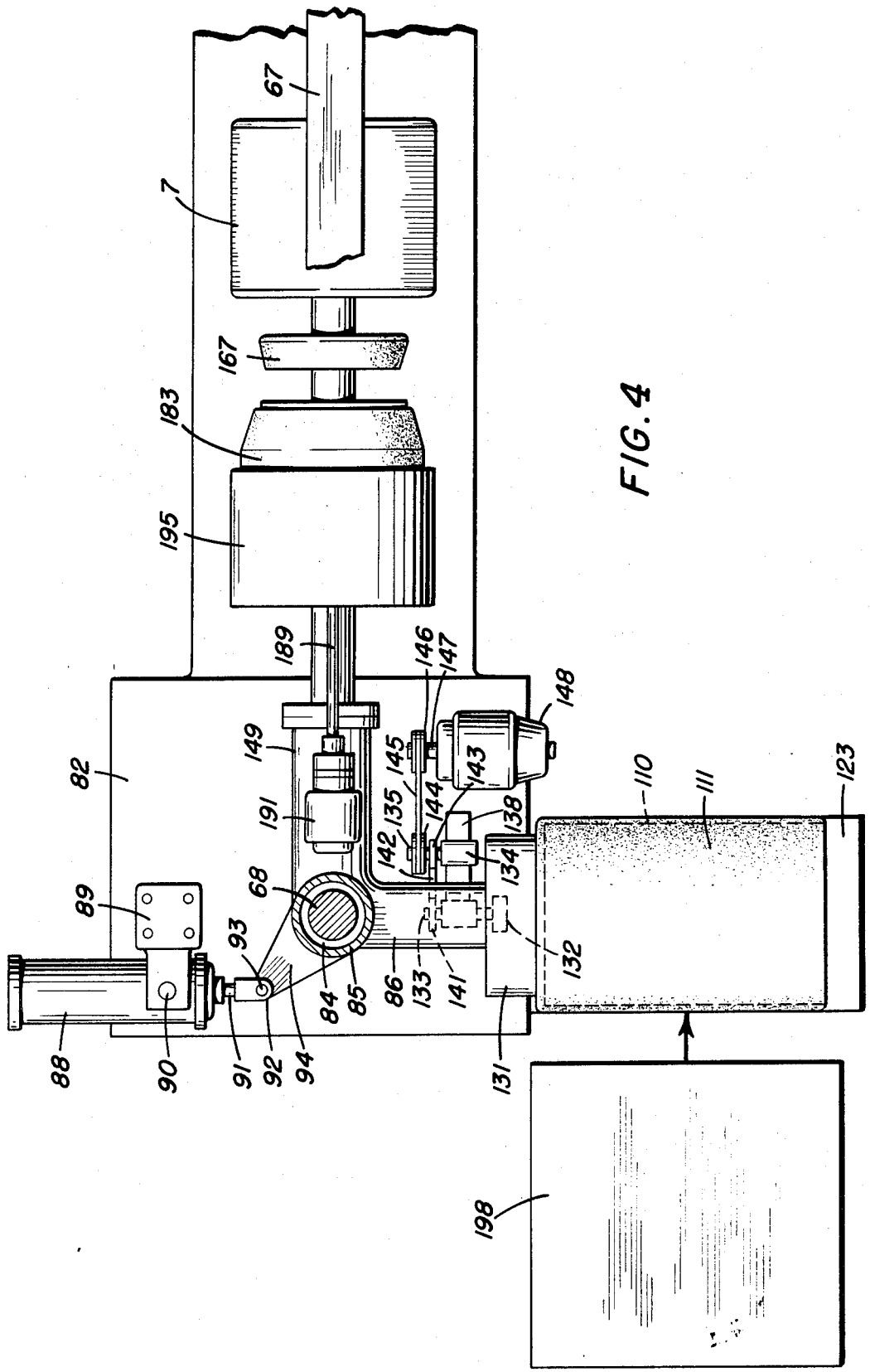

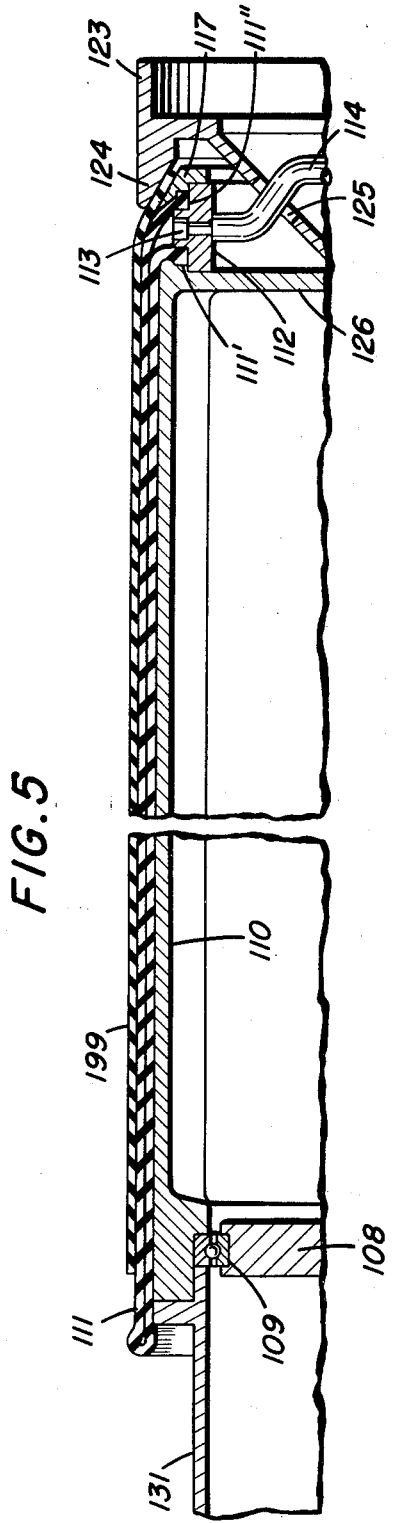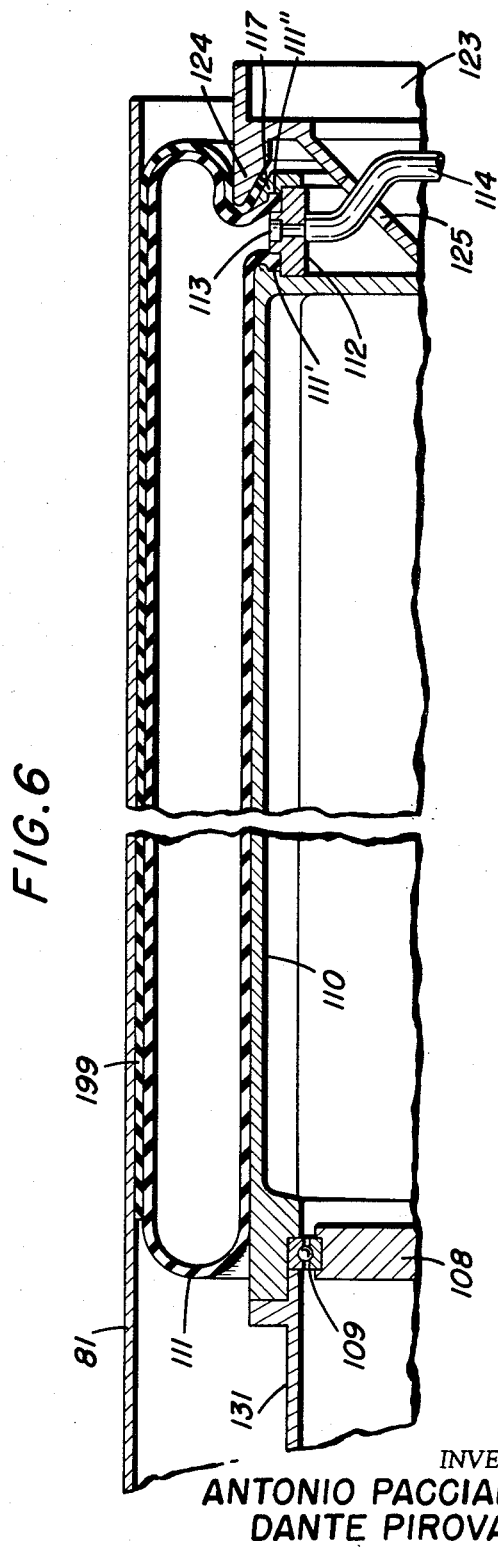

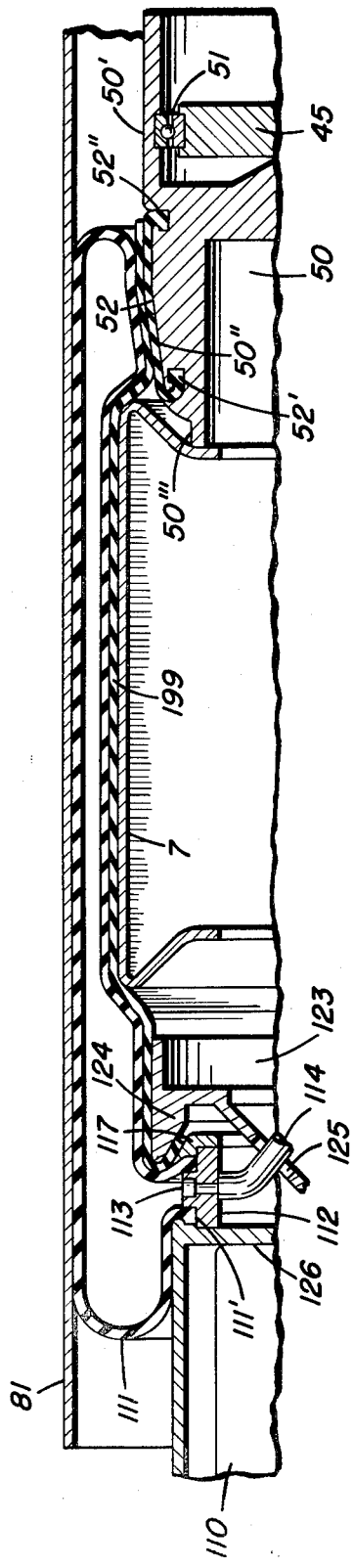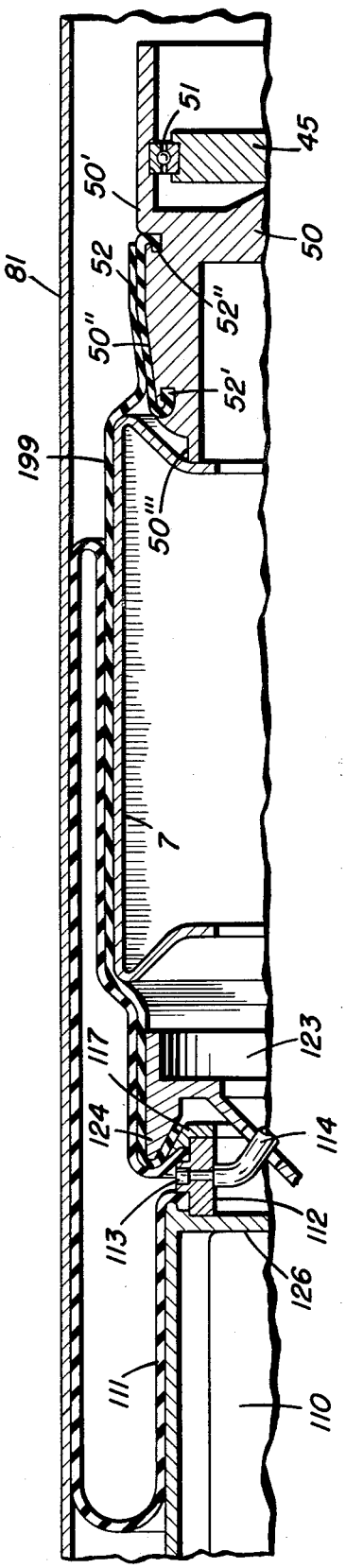

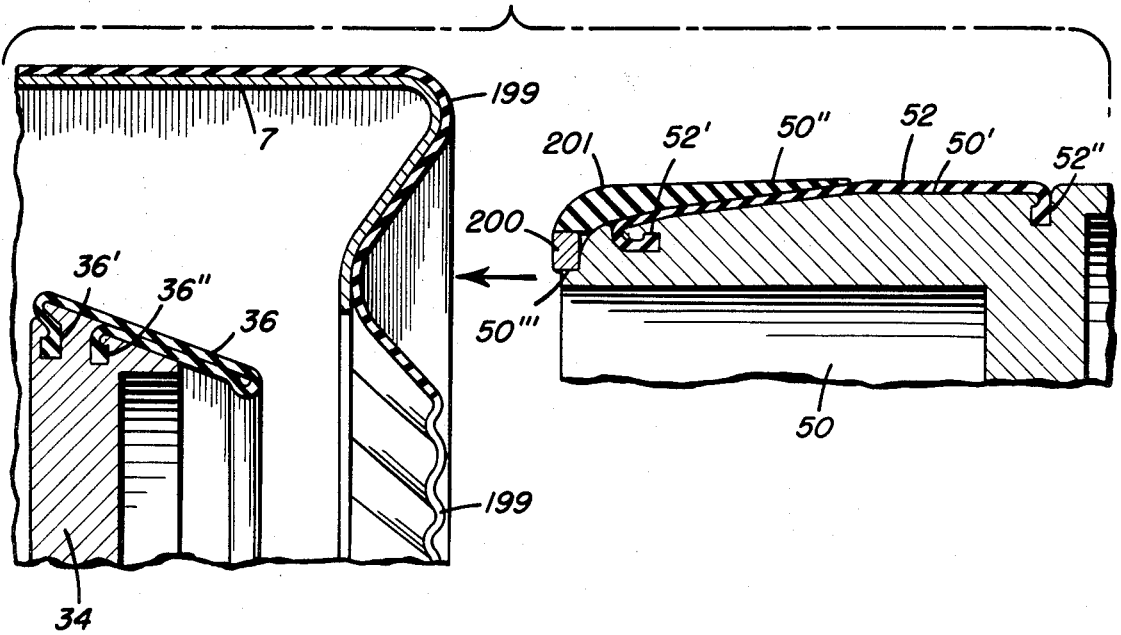
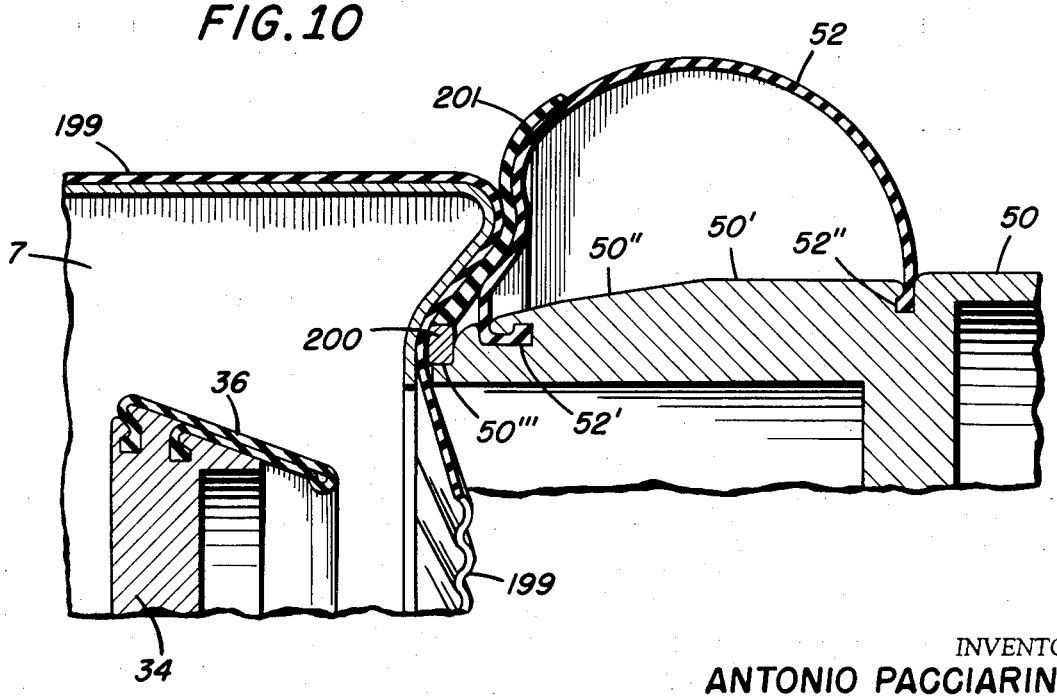

3,694,290
APPARATUS FOR THE MANUFACTURE OF PNEUMATIC TIRES
Antonio Pacciarini and Dante Pirovano, Milan, Italy, assignors to Industrie Pirelli S.p.A.
Continuation of abandoned application Ser. No. 701,585, Jan. 30, 1968. This application Feb. 12, 1971, Ser. No. 115,124
Claims priority, application Italy, Feb. 8, 1967, 12,402/67
Int. Cl. B29j 17/10, 17/12
U.S. Cl. 156—401
46 Claims

ABSTRACT OF THE DISCLOSURE

Apparatus for the manuafacture of pneumatic tires comprising means for disposing a plurality of carcass plies in the form of a continuous tubular ring around a cylindrical support, means operative with said support to clamp one edge of said ring to said support, means to move the support into coaxial relationship with one side of the building drum with said clamped edge being adjacent said one side, means to turn said plies from said support onto said drum in such a manner that their inner faces are turned towards the outside and means to apply bead cores and filler strips and to turn up the edge of said plies around said beads and filler strips.

---

This application is a continuation of Ser. No. 701,585 filed Jan. 30, 1968, abandoned.

BACKGROUND OF THE INVENTION (1) Field of the invention

The present invention relates to the manufacture of pneumatic tires and in particular to the manufacture of large size tires having a radial carcass.

(2) Prior art

To build up small or normal tires, a cylindrical drum with rounded shoulders is generally used. In these arrangements, the carcass plies, usually in the form of strips, are paid off from a roller whose axis is parallel to that of said drum and are wound up directly on the latter, so that regular carcasses are obtained, the cords of which are always parallel to one another. This is also true in the case of radial tires, since the plies containing the cords are not subjected to deformations.

However, to build up tires of large size, the same means for applying the plies on the drum cannot be followed, because drums having high shoulders and provided with an undercut are used, and the reinforcing cores of the tire beads correspond to this undercut and are thus of a diameter considerably smaller than that of the peripheral band of the drum.

If the carcass plies, in which the cords are already in close proximity to one another, were directly wound up on said drums, a serious difficulty would be encountered in turning their edges which project from the drum towards the axis of the drum in order to allow the application of the bead cores corresponding to the drum undercuts. This is due to the fact that these edges suffer a considerable reduction in their diameter, and the cords contained in the edges would become even closer.

It is therefore a common practice to build up two-ply pockets on an auxiliary drum having a diameter smaller than that of the building drum, the two-ply pockets being in the form of a continuous ring by starting from plies in the shape of strips, to cover each pocket with a rubber sheet, to remove the assembly obtained from the auxiliary drum, to turn it outside in such a manner that the rubber sheet is in its inside, to insert it on a support generally constituted by bars disposed along the generatrices of a cylinder but spaced from one another, to expand it, and to insert it axially on the building drum.

In this manner, in consequence of the expansion of the pockets, the cords in the latter are more spaced than they were before the insertion of the plies on the drum so that the turning down of the ply edges towards the axis of the drum is considerably facilitated. This practice, however, is somewhat troublesome and the various operations to which the plies are subjected result in the cords, after the application of the plies on the drum, no longer being uniformly parallel to one another and, in the case of radial carcasses, not forming an angle of 90° with the median plane of the building drum.

SUMMARY OF THE INVENTION

The present invention is an apparatus to carry out a method for the manufacture of pneumatic tires which comprises the automatic application of the carcass plies on the building drum, carried out by turning outside in and inserting on said drum, in a single operation, the plies in the form of a continuous ring so as to insure that the cords of said plies are always perfectly parallel to one another and that, at the end of the operation, to insure that the plies are exactly centered with respect to the median plane of the drum.

The application of the plies in accordance with the present invention comprises means for disposing the carcass plies and the rubber sheet in the form of a continuous ring around a cylindrical support and then, while the support is coaxially disposed at the side of the building drum, means for turning the plies directly inside out on said drum in such a way that their faces, which are inner with respect to the cylindrical support, are turned towards the outside.

In carrying out the turning operation, means are provided so that the edges of the plies which are nearest to the building drum in a position symmetrical with respect to the drum midline are disposed and maintained in the position which is to be taken by the opposite edge of said plies in order that the plies may be exactly centered on the drum.

The present invention comprises an apparatus for the manufacture of pneumatic tires which includes means for carrying out automatically the above-described method, to thus insure an accurate building up of the tire.

Briefly summarized, the apparatus of the present invention includes a building drum, a rigid cylinder for the plies adapted to be coaxially disposed at the side of said drum, and means adapted to turn the plies inside out directly on the building drum so that their inner faces, with respect to the cylinder, are directed towards the outside.

The apparatus may be provided with a device for clamping one edge of the plies at a distance adjustable in accordance with the width of the plies, and with means for the application of the bead cores, the fillers for the tire beads, and the metallic chafers in correspondence of said beads, as well as means for turning up of the ply edges around the bead cores.

BRIEF DESCRIPTION OF THE DRAWINGS

The present invention will be more clearly apparent from the following description, made with reference to an embodiment of the same illustrated by way of example in the attached drawings, in which:

FIG. 4 is a diagrammatic top view of the apparatus shown in FIGS. 1–3, taken along line 4—4 of FIG. 3, and depicting the device for supplying sheeted tire components;

FIGS. 5–8 are partial vertical sectional views illustrating position of components of the apparatus during the various operations for turning the carcass plies inside out and folding them over on the building drum;

FIGS. 9 and 10 are partial vertical sectional views; illustrating the positional relationship of certain components during the operations for applying the bead core and the filler of the bead on the right side of the building drum;

DESCRIPTION OF THE PREFERRED EMBODIMENTS

Figure 1:
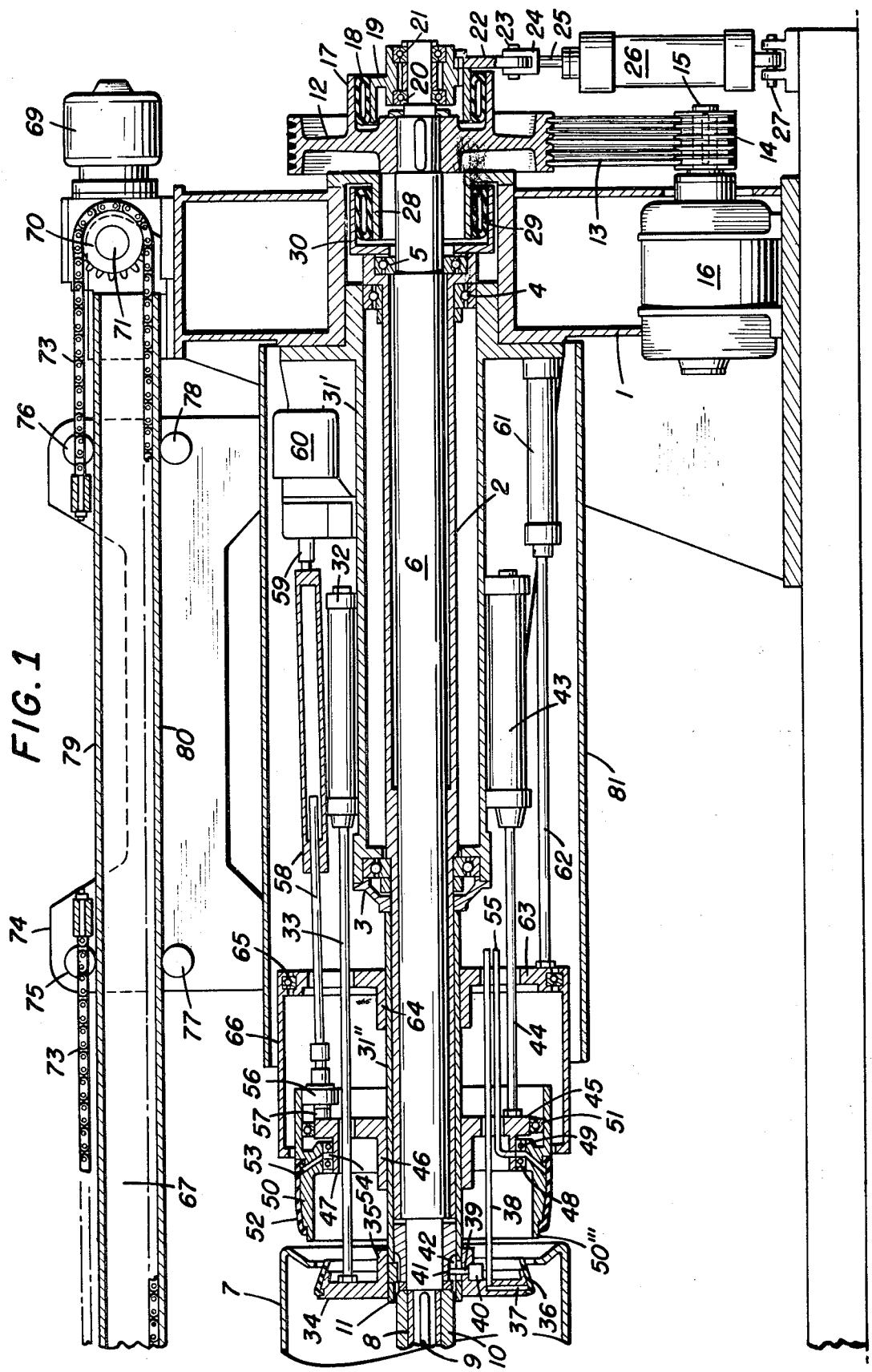
FIGS. 1 and 2 are vertical partial longitudinal sectional views of the apparatus for the manufacture of pneumatic tires in accordance with the present invention, with FIG. 2 showing the device for turning the carcass plies inside out and folding them over on the building drum.

Referring specifically to FIG. 1 of the drawings, the reference numeral 1 refers to a frame which has a hollow mandrel 2 rotatably mounted therein by means of ball bearings 3 and 4. A shaft 6 is also rotatably assembled in mandrel 2 by means of ball bearing 5. Shaft 6 supports a collapsible building drum 7 in which the sectors defining its outer surface are connected in a conventional way, by means of articulated levers (not shown in the figures) to a hub 8 keyed on the shaft 6 by means of a key 9, and to a sleeve 10 rotatably assembled on the hub 8. The sleeve 10 is connected by means of a claw clutch 11 to the hollow mandrel 2. At the opposite end of the shaft 6 there is keyed a pulley 12 which is connected, by means of a V-belt drive 13, to a pulley 14 keyed on the shaft 15 of the motor 16. The pulley 12 is laterally provided with an annular lug 17 against which may engage a pneumatic clutch constituted by an inflatable air bag 18 having an annular shape and a hollow rectangular section and fixed on the peripheral band of a pulley 19, the latter being assembled at the same end of the shaft 6 by means of the ball bearings 20 and 21. Pulley 19 is integral with a swinging crank 22 which is connected by means of pin 23 to a fork 24, the latter being integral with the outer end of a stem 25 slidable in the double-acting cylinder 26 which is pivoted on the pin 27, which, in turn, is mounted on the base of the frame 1.

Another pneumatic clutch constituted by an inflatable air bag 29 equal to the air bag 18, is mounted on a ring 28 of frame 1, and is adapted to engage against a bell 30 integral with one end of the hollow mandrel 2.

Figure 11:
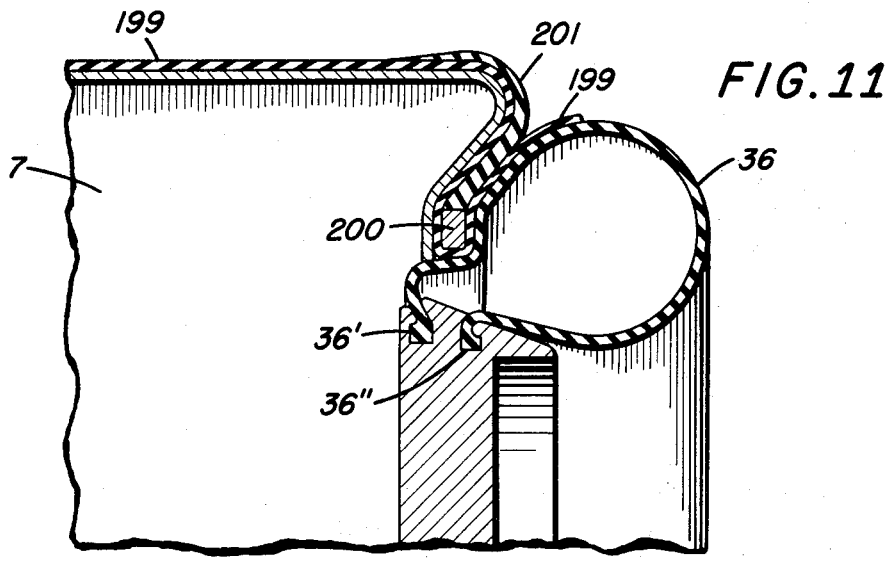
FIG. 11 is a partial vertical sectional view illustrating the position of one member during the operation for the turning up of the ends of the plies about the bead core on the right side of the building drum.
Figure 13:
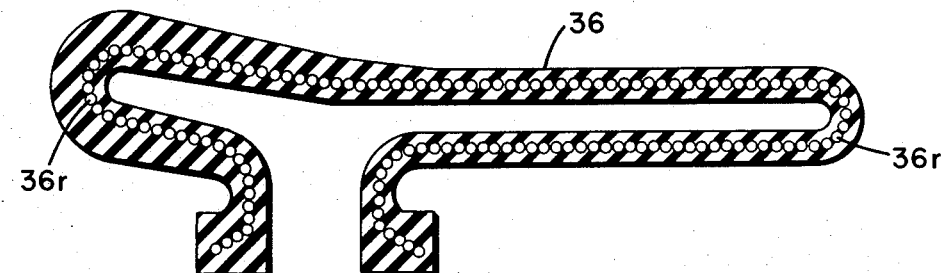
FIG. 13 is a sectional view of membrane 36 (and its identical counterpart on the opposite side of the drum membrane 167) showing the extensible longitudinal reinforcements therein.

The frame 1 comprises a tubular element constituted by two parts 31' and 31'' of different diameter, a portion of the latter part extending inside the drum 7. On the tubular part 31' there is mounted a double-acting cylinder 32 whose stem 33 is connected at its outer end with the flange 34 of a hub 35 slidable along the tubular part 31''. Flange 34 is provided with a peripheral frusto conical band 34', the generatrices of which converge away from the midline of the drum 7. A tubular membrane 36, folded on its self, is fastened at its thickened edges 36' and 36'' to the peripheral band of the flange 34, as shown in FIGS. 9–11. Membrane 36 is provided with inextensible reinforcements 36r in FIG. 13 extending from one thickened edge to the other, and its inside can be connected, through the duct 37 and the tube 38 (FIG. 1), to a source of compressed air or, alternatively, to a vacuum pump. A small piston 40 is disposed in a cylindrical cavity 39 of the hub 35, which piston can be moved in two directions by means of compressed fluid. The stem 41 of piston 40 is adapted to engage in a recess 42, formed in the tubular part 31'', in order to stop the stroke of the hub 35 in the desired position.

Moreover, the tubular part 31' is also connected with a double-acting cylinder 43, whose stem 44 is connected at its outer end with the flange 45 of a hub 46, slidable along the tubular part 31''. The flange 45 is provided with an annular lug 47, on which are assembled the ball bearings 48 and 49, supporting a revolving bell 50, also supported by the ball bearing 51. The outer surface of the bell 50 is composed by a cylindrical portion 50', a frusto conical portion 50'', and an annular portion 50''', also as shown in FIGS. 9 and 10. On the frusto conical portion 50'', and on a part of the cylindrical portion 50', there is spread an annular membrane 52, whose thickened edges 52' and 52'' are secured to the outer band of the bell 50 and are provided with inextensible reinforcements (not shown) in proximity to their thickened edges. The annular portion 50''' serves to support a bead core, and the inside of the membrane 52 is connected, by means of a duct 53, to an annular chamber 54, interposed between the ball barings 48 and 49, into which opens one end of a tube 55, which in turn is connected at its other end alternatively with a source of compressed air or with a vacuum pump. A rubber roller 56 engages against the inner surface of bell 50 to rotate same, and is supported by a hub 57, one end of which is assembled to idle on flange 45, and the other end of which is connected to one end of a telescopic shaft 58. The other end of telescopic shaft 58 is connected to the shaft 59 of a motor-speed reducer 60, assembled on the tubular part 31' of the frame 1.

A double-acting cylinder 61 is also fixed to frame 1 and has a stem 62 which is connected, at its outer end, with the flange 63 of a hub 64 slidable along the tubular part 31'' of the frame 1. The flange 63 supports an idle cylindrical bell 66 by means of the ball bearing 65.

Figure 2:
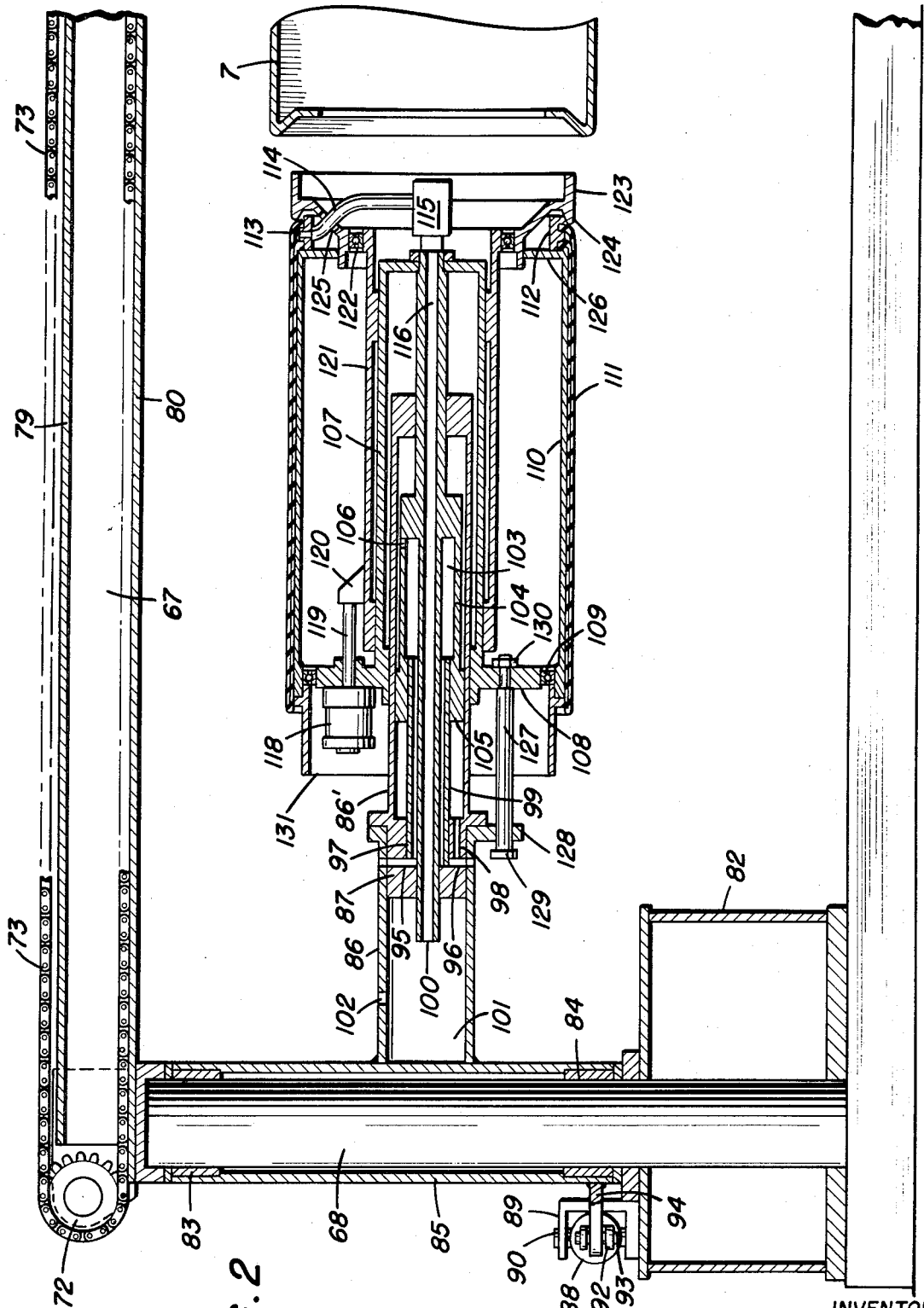

On the upper portion of frame 1 there is assembled an end of a longitudinal beam 67, the other end of which is supported by the column 68, disposed at the other side of the drum 7, as shown in FIG. 2. The right end of the longitudinal beam 67 carries a reversing motor 69 which, by means of a driving gear not visible in the figure, controls a bidirectional rotation of two gears 70 symmetrically keyed on the shaft 71 with respect to the longitudinal median plane of the beam 67. As shown in FIG. 2, two idler gears 72 are disposed at the end of the beam 67 supported by the hollow column 68, with gears 72 extending symmetrically with respect to the longitudinal median plane of the beam 67. A chain 73 is mounted on each pair of gears 70, 72 and is fixed at its ends on a carriage 74, which, by means of the pairs of small rollers 75, 76, 77, 78, can slide along the guides 79 and 80, respectively provided on the upper and lower face of the beam 67. The carriage 74 is provided, in its lower portion, with a rigid tube 81 coaxial with the drum 7 and telescopically slidable from the hollow column 68 to the frame 1, and vice versa.

As shown in FIGS. 2 and 4, the lower portion of column 68 is surrounded with a frame 82, on which is rotatably assembled, around the bushings 83 and 84, a hollow column 85, which is coaxial with the column 68 and sustains a horizontal tubular support 86. This latter support supports a cylindrical extension 86', and is provided in its inside with a baffle 87.

A double-acting cylinder 88 is provided to rotate the hollow column 85 about its own axis, cylinder 88 being supported by a vertical support 89, which is rotatably assembled about a vertical pin 90. The stem 91 of the cylinder 88 is provided, on its outer end, with a fork 92, in which is inserted a pin 93, and a crank 94 is pivoted on pin 93 and is integral with the hollow column 85.

The baffle 87 is provided with two radial ducts and 95 and 96 which can be connected wtih a source of fluid under pressure or with a vacuum pump, with an axial duct 97 in communication with the duct 95, and with a duct 98 parallel to the duct 97 and in communication with the duct 96. In the axial duct 97 there is fixed the end of a tube 99, inside which is mounted a coaxially extending tube 100. This latter tube is slidable axially and has one end opening into a chamber 101 provided with an opening 102 which can be put into communication with a source of compressed air or with a vacuum pump. The other end of the tube 100 passes through the cavity 103 of the hollow stem 104 of a piston 105, with which it is integral. The hollow stem 104 is provided with a cavity 103 and with a lateral opening 106 which connects this cavity with the hollow space defined by the stem 104 and by the inner surface of the cylindrical extension 86'. At the end of the hollow stem 104 opposite to the end corresponding to piston 105 there is secured a cylindrical element 107, coaxial with stem 104 and provided with a flange 108, on the periphery of which there is assembled a ball bearing 109.

Figure 14:
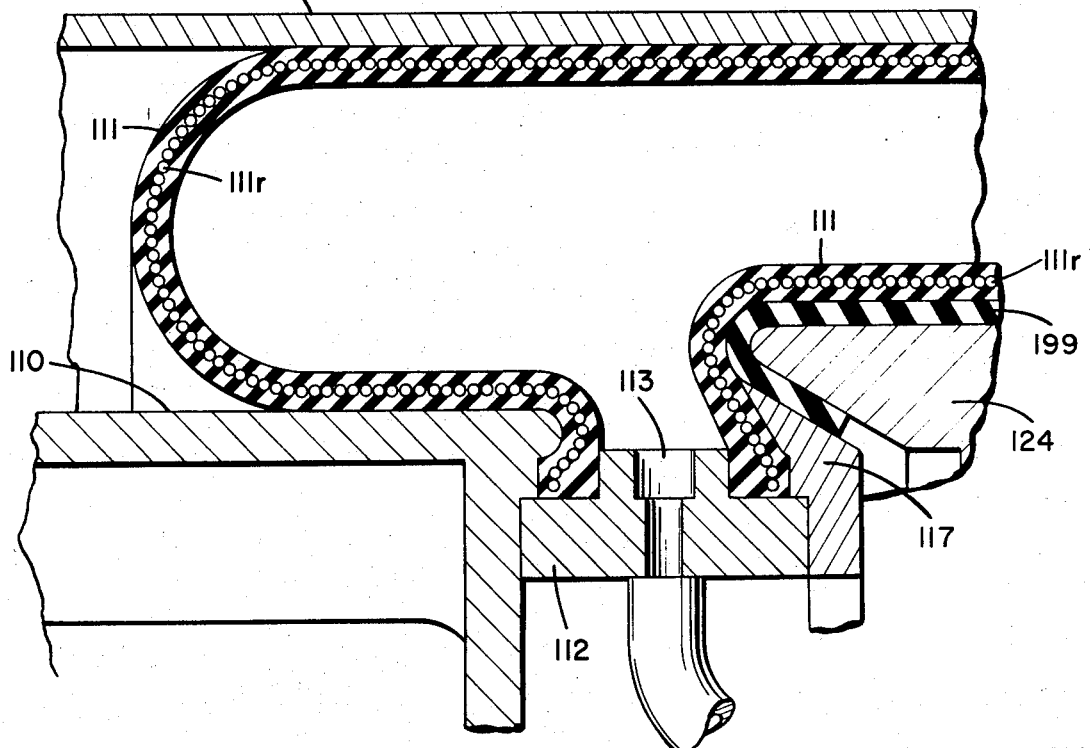
FIG. 14 is an enlarged partial sectional view as shown in FIG. 7 of the membrane 111 depicting the inextensible longitudinal reinforcements therein.

As shown in FIGS. 2, 5, and 6, bearing 109 supports a cylindrical body 110, which is wrapped by a tubular membrane 111 which is adapted to be expanded radially as will be described in detail later. This membrane is provided with longitudinal inextensible reinforcements 111r in FIG. 14, is folded upon itself, and is fastened at its thickened end edges 111' and 111" with a ring 112. The ring 112 is provided with a hole 113 and is connected by means of a tube 114 and a revolvable joint (diagrammatically represented in FIG. 2), with the axial hole 116 of the hollow stem 104, and therefore, also with the inside of the tube 100 and the chamber 101. The ring 112 is also provided with a flange 117, as shown in FIGS. 5–8, which has an axially outermost frusto conical annular surface, the generatrices of which converge towards the building drum 7 when the ring 112 is in a coaxial position relative to drum 7 as seen in FIG. 2.

A double-acting cylinder 118 is mounted on flange 108 and has a stem 119 integral with the support 120 of a tubular element 121 slidable along the outer surface of the cylindrical element 107. At the end of the tubular element 121 there is assembled a ball bearing 122, which supports a revolving bell 123 provided with an annular lug 124, which has a frusto conical lateral surface parallel to the frusto-conical surface of the flange 117 of ring 112. The bell 123 is provided with a hole 125 for the passage of the tube 114 and supports one end of the rigid cylinder 110 through the inner flange 126 of same, so as to obtain a relative sliding between the flange 117 of the cylindrical body 110 and the annular lug 124 of the bell 123 in an axial direction. A rod 127 is slidably assembled in a hole of a lug 128 of the tubular support 86, and in a hole of the flange 108; and has an enlarged head 129 at one end, and a threaded portion at the other end on which is screwed a nut 130. Rod 127 thus acts as an adjustable stop for the stroke of the piston 105 towards the building drum 7.

Rigid cylinder 110, along with its associated apparatus, is adapted to be rotated about column 68 from a position shown in FIG. 2 where it is coaxial with the building drum 7 to a position shown in FIG. 4, which is approximately 90° in the clockwise direction from the position of FIG. 2. At the end of the rigid cylinder 110 opposite to the end turned towards the building drum 7, there is secured a circular crown 131, against which a rubber roller 132 is adapted to engage when the crown is in the latter position. The roller 132 is mounted on the end of a small shaft 133, rotatably inserted in an L-shaped crank 134, which is rotatably mounted on a small shaft 135 sustained by a support 136 secured to the frame 82. The L-shaped crank 134 can be rotated about the small shaft 135 by means of a piston 137, slidable in the single-acting cylinder 138, integral with the support 136. Cylinder 138 has a stem 139 which is adapted to engage against the end 140 of the crank 134 and to rotate the latter in a clockwise direction about the small shaft 135 so as to engage the roller 132 against the crown 131.

The small shaft 133 also has a gear 141 keyed to it, said gear 141 being connected by means of a toothed belt 142 with a gear 143, keyed on the small shaft 135, on which is also keyed a pulley 144. This latter pulley is connected through a belt drive 145 to the pulley 146, which, in turn, is keyed on the shaft 147 of a motor 148 secured to the base of the frame 82.

The hollow column 85 also supports a horizontal cylindrical support 149 (FIG. 3) having a cylindrical extension 149', and extending approximately 90° with respect to the cylindrical extension 86 of FIG. 2, as shown in FIG. 4.

The cylindrical extension 149' has an axial hole 150 at its end nearest to the building drum 7, and support 149 is provided in its inside with a baffle 151 having two radial ducts 152 and 153, which can be connected with a source of compressed fluid or a vacuum pump, with an axial duct 154 in communication with the duct 152, and with a duct 155, parallel to the duct 154 and in communication with the duct 153. In the axial duct 154 there is secured the end of a tube 156, inside which and coaxially thereto is mounted an axially slidable tube 157, an end of which opens in the chamber 158, the latter being provided with an opening 159 which can be connected with a source of compressed fluid or with a vacuum pump. The other end of tube 157 passes through the cavity 160 of the hollow stem 161 of a piston 162, and opens in an axial duct 163 of the stem 161, to which it is integral.

The stem 161 is slidably mounted in the hole 150 and is provided, in proximity of the latter, with a lateral hole 164 communicating with cavity 160. A ring 166 is secured to the free end of stem 161 by means of the spokes 165, and has a peripheral band of frusto conical shape, with its generatrices converging away from the drum 7 midline. Thickened edges 167' and 167" which is substantially identical to membrane 111 of a tubular membrane 167 are fixed on the periphery of ring 166 as in the case of the flange 34, the membrane 167 being folded upon itself and being provided with inextensible reinforcements as in membrane 111 in FIG. 14 extending from one of its edges to the other.

From the end of the axial duct 163, opposite to that connected to the tube 157, extends an axial duct 168 which is connected, through a tube 169, with a radial duct 170 carried by ring 166 and opening on the inner face of the membrane 167.

The ring 166 is integral with one end of a slidable rod 171 which is inserted at the other end in a lug of the tubular support 149 and which is provided with a thread, on which is screwed a nut 172, the rod 171 thus acting as an adjustable stop for the stroke of the piston 162 towards the drum 7. A double-acting cylinder 173 is secured to a lug of the cylindrical extension 149', cylinder 173 having a stem 174 which, at its outer end, is integral with the support 175 of a tubular body 176 slidable along the outer surface of the cylindrical extension 149'. The tubular 176 is provided, at its end directed towards the drum 7, with a flange 177, on the periphery of which there is assembled the ball bearing 178 which supports the revolving bell 179. This bell is also supported by the ball bearings 180 and 181, assembled on the ring 182 integral with the flange 177. Analogous to the arrangement with respect to the bell 50, the outer surface of the bell 179 has a cylindrical portion 179', a frusto conical portion 179" and an annular portion 179'''. On the frusto conical portion 179" and on a part of the cylindrical portion 179' there is spread a membrane 183 provided at its thickened clamped edges 183′, 183″, with inextensible reinforcements (not shown), which form a reduced zone in proximity of said thickened edges. The annular portion 179‴ is adapted to support a bead core, and the inner surface of the membrane 183 is connected, by means of ducts 184, to an annular chamber 185 interposed between the ball bearings 180 and 181. Tube 186 opens into chamber 185 and can be connected, at its other end, with a source of compressed air or with a vacuum pump.

A rubber roller 187 engages against the inner surface of bell 179 to rotate same, and is supported by a hub 188, having one end assembled to idle on flange 177 of the tubular body 176 and the other end connected to one end of a crank shaft 189, the other end of the latter being connected to the shaft 190 of a motor-speed reducer 191, assembled on the horizontal cylindrical support 149. On the outer surface of the tubular body 176 there is slidably assembled a hub 192, provided with a flange 193, which has on its periphery a ball bearing 194 which, in turn, supports the cylindrical idle bell 195. A double-acting cylinder 196 is connected to flange 193, and has a stem 197 integral with the flange 177.

A supply means 198 is shown diagrammatically in FIG. 4, and extends parallel to the cylinder covered with the membrane 111 when the cylinder is in its inoperative position, and supplies the cord plies and the rubber sheets to be inserted on the building drum 7.

The operation of the above illustrated apparatus will also be described with reference to FIGS. 5–12.

Assuming that the collapsible drum 7 is in a collapsed position, corresponding to the operation of removing therefrom the previously built up tire, the drum is initially raised to its expanded position, as represented in the figures. For this purpose compressed air is admitted to the air bags 18 and 29 (see FIG. 1) to cause them to firmly adhere to the annular lug 17 of the pulley 12 and to the bell 30 integral with the hollow mandrel 2, so as to fix the latter with the ring 28 of the frame 1, and the crank 22 integral with the pulley 12. The compressed fluid is then admitted to the lower part of the cylinder 26 to raise the piston sliding in its inside and to cause a predetermined rotation of the pulley 12 and, therefore, of the shaft 6 on which it is keyed; as well as of the hub 8, also keyed on the shaft 6. Rotation of the sleeve 10, which is mounted on hub 8, is prevented since the hollow mandrel 2 is maintained in a fixed position on the frame 1 by the air bag 29. Therefore a relative rotation occurs between the hub 8 and the sleeve 10, it being understood that this rotation causes the straightening of a plurality of articulated levers connected to the sectors defining the outer surface of the drum, and therefore the passage of the latter to an expanded condition. These lever sectors and the function thereof are not shown or described in the interest of brevity.

At the beginning of the building operation, the cylindrical body 110 wrapped by the membrane 111 is in the position of FIG. 4 extending parallel to the supply means 198, and the annular lug 124 of the bell 123 is at the greatest pre-established distance from the flange 117 of the ring 112.

The operation is started by unwinding the carcass plies and the rubber sheet from the corresponding rollers assembled on the supply means 198, FIG. 4, and by winding them up again on the membrane 111, which wraps the cylindrical body 110. During this operation, the cylindrical body 110 is rotated about its own axis by means of the roller 132, (FIG. 3), which is caused to engage against the crown 131 by admitting compressed air in the right end of cylinder 138, and which is caused to rotate about its own axis by means of the motor 148, the pulleys 146 and 144 connected to the belt drive 145, the gears 143 and 141 connected through a toothed belt 142. Then the ends of each ply and of the sheet are joined together so as to obtain a continuous annular unit shown by the reference numeral 199 in FIG. 5, the correct axial position of the unit 199 on the cylindrical body 110 being controlled with reference to the edge of the annular lug 124 of the revolving bell 123.

The edge of the unit 199 is then clamped between the flange 117 of the cylindrical body 110 and the annular lug 124 of the bell 123 by admitting compressed fluid at the right end of cylinder 118 (see FIG. 2 and 5) to cause the displacement of its piston to the left, and, consequently, a displacement of the bell 123 in the same direction. Of course, it is to be understood that the unit 199 can be built up separately and then be inserted on the cylindrical body 110 already in the shape of a continuous ring. At this moment compressed fluid is admitted into the back end of cylinder 88 (see FIG. 4) so as to rotate crank 94 through 90° in a counterclockwise direction which causes a corresponding movement of the hollow column 85, and the tubular supports 86 and 149 with the members supported by them. As a result of this rotation, the cylindrical body 110 is disposed at the side of, and coaxial with, the drum 7.

As shown in FIG. 2, for each different width of the plies it is necessary to establish a predetermined position of the members 117 and 124 clamping the ply edges with respect to their axial spacing from the building drum 7. This position must be exactly symmetrical, with respect to the median plane of the drum, to the position which the free edge of the plies will take after they are turned inside out on the drum, so as to be exactly centered on the same. In order to achieve this, the stroke of the piston 105 is adjusted by means of the nut 130 and compressed fluid is admitted through ducts 96 and 98 to bring the members 117 and 124 in an exact pre-determined position.

Compressed fluid is then admitted to the right end of cylinder 43 (FIG. 1) to displace the bell 50 completely to the left (FIGS. 7 and 8), which bell must act as a support for the free edge of the plies after they are turned inside out as will be described in detail later, and to limit the expansion of the membrane 111 towards the drum axis. Motor 69 (FIG. 1) is then actuated to move the carriage 74 to the left side of the beam 67, so that the rigid tube 81 may surround the cylindrical body 110 (FIGS. 6–8). Compressed air is then admitted through the opening 102 of the tubular support 86; and after passing through the tube 100, the axial hole 116, the revolvable joint 115, the tube 114 and the hole 113, the air comes into contact with the inner surface of the membrane 111 and expands both said membrane and the unit 199 constituted by the cord plies, causing them to engage against the inner face of the tube 81, as shown in FIG. 6.

Motor 69 is then actuated to displace the carriage 74, and therefore the rigid tube 81, to the right until the latter takes a position surrounding the building drum 7. By virtue of the displacement of the rigid tube 81 to the right, the unit 199 is turned inside out onto the drum 7 to extend symmetrically beyond both edges of the drum with respect to the midline of the latter. Under the pressure of the membrane 111, unit 199 reduces its diameter and takes again the diameter of the rigid drum against which it is pressed by the membrane, as shown in FIG. 7.

The carriage 74 and the rigid tube 81 are then again displaced to the left by means of motor 69 to again bring the membrane 111 around the cylindrical body 110, while leaving the unit 199 disposed on the drum 7 as shown in FIG. 8. Then compressed air is discharged from the membrane 111 and from the left end of cylinder 118, which causes the membrane to again take the position of FIG. 5. Compressed air is also admitted through the right end of said cylinder to free the edge of the unit 199 from between the flange 117 and the annular lug 124. At this moment the carriage 74 with the rigid tube 81 is again brought to the right end of the beam 67 to allow a rotation of the tubular supports 86 and 149 through 90° in a clockwise direction to bring bell 179 to the side of, and coaxial with, drum 7. This rotation is effected by discharging compressed fluid from the back end of cylinder 88 and by admitting compressed air from its opposite end.

Compressed fluid is then discharged from the right end of cylinder 43 and compressed fluid is admitted into the opposite end, to again bring the bell 50 to the fartherest position with respect to the building drum 7. This permits the subsequent stitching of the ply edges projecting from said building drum 7 by a device not represented in the drawings, to cause the edges to adhere to the shoulders of the drum. The stitching operation is carried out by rotating the drum 7 about its own axis by means of motor 16 through the pulleys 14 and 12 and the belt drive 13, after having deflated the air bags 18 and 29.

Then a bead core 200 for the reinforcement of the tire beads is applied on the annular portions 179''' and 50'''' of the bells 179 and 50, respectively, as shown in part in FIG. 9, after which the bell 50 is rotated about its own axis by means of the motor 60, the telescopic shaft 58 and the rubber roller 56 in order to apply a rubber filler 201 in flat position on the frusto conical part 50'' of said bell, as shown in FIG. 9. Similarly, the bell 179 is rotated by means of the motor 191, the crank shaft 189 and the rubber roller 187 to apply a similar rubber filler 201 in flat position on the frusto conical part 179'' of the bell 179.

Compressed fluid is then simultaneously admitted to the end of cylinders 173 and 43, opposite that directed towards the building drum 7 in order to displace the tubular body 176 and the hub 46 axially towards the drum by means of the stems 174 and 44, respectively, which results in the bead cores 200 being pressed against the shoulders of the building drum 7 as in FIG. 10. Then compressed air is simultaneously admitted to the tubes 55 and 186, which open respectively into the annular chambers 54 and 185. From these chambers the compressed air passes, through ducts 53 and 184, to the inner surfaces of membranes 52 and 183 so as to expand both of the membranes and the fillers 201 overlying them, and to cause these fillers to adhere to the sides of the unit 199 at the drum shoulders as shown in FIG. 10. At the end of this operation, compressed air is discharged from the inside of membranes 52 and 183 through tubes 55 and 186, and compressed fluid is discharged from the end of cylinders 43 and 173 opposite that directed towards the building drum 7. Also, compressed fluid is then admitted from said latter end in order to again separate the bells 50 and 179 from the drum 7. For the application of the fillers 201 on the sides of the drum 7, it may be advantageous to initially surround the latter with the rigid tube 81 in order to limit the expansion of the membranes 52 and 183. Then the fillers are stitched against the drum shoulders by means of the above-indicated stitching device, while drum 7 is rotated again by means of motor 16.

To carry out the turn up of the ply edges 199 about the bead cores 200, the hub 35 with its corresponding flange 34, and the ring 166, are partially and simultaneously removed from a position within the building drum 7, as shown in FIG. 10, to a position outwardly therefrom, as shown in FIG. 11. To effect this movement, compresed fluid is admitted from the end of cylinder 32 directed towards the drum 7 in order to cause the stem 33 to partially re-enter said cylinder. The desired position of the flange 34 is adjusted by admitting compressed air to the radially outermost end of cavity 39 so that the stem 41 of piston 40 may penetrate in the recess 42 formed in the tubular part 31''.

Ring 166 is similarly removed from a position within the drum 7 to a position outwardly therefrom by admitting compressed fluid through tube 152 and tube 156, to the cavity 160 of the hollow stem 161, from which the fluid passes, through the opening 164, into an annular cavity defined by said stem and by the cylindrical extension 149', thus exerting a pressure on piston 162 to move it in a direction away from the drum 7. The ring 166 is secured in the desired position by means of a stop, not represented in the figure, which acts on the rod 171.

During the removal of the flange 34 and the ring 166 from the drum, the inside of the membranes 167 and 36 is connected with a vacuum pump in order to stiffen them. When the flange 34 and the ring 166 have reached their pre-established position to carry out the turn up of the edges of the plies 199 in order to make said edges adhere to their corresponding bead cores 200 and to the fillers 201 as shown in FIG. 11, the inside of membranes 36 and 167 is placed in communication with a source of compressed fluid, respectively through tube 38 and duct 37, and through opening 159, tube 157, duct 163, duct 168, tube 169, and duct 170. After the turning up of the edges of the plies 199, membranes 36 and 167 are then deflated through the above-indicated ducts and tubes, which are then connected again to the vacuum pump. At this moment, the stop acting on the rod 171 is disengaged, and the ring 166 is caused to return inside the drum 7 by admitting compressed fluid through ducts 153 and 155 to push piston 162 to the right, and by discharging this fluid through the opening 164, the tube 156, and the radial duct 152. Simultaneously, the flange 34 is brought inside the drum 7 by admitting compressed fluid from the end of cylinder 32 opposite to that directed towards the drum 7, and by discharging this fluid from the opposite end, after having disengaged the stem 41 from the recess 42 of the tubular part 31'' by discharging compressed fluid from the radially outermost end of the cylindrical cavity 39, and by admitting it from the opposite end. Then the drum 7 is rotated again by means of motor 16 and the turned up ply edges are stitched over their corresponding fillers 201 by means of the stitching device.

Figure 12:
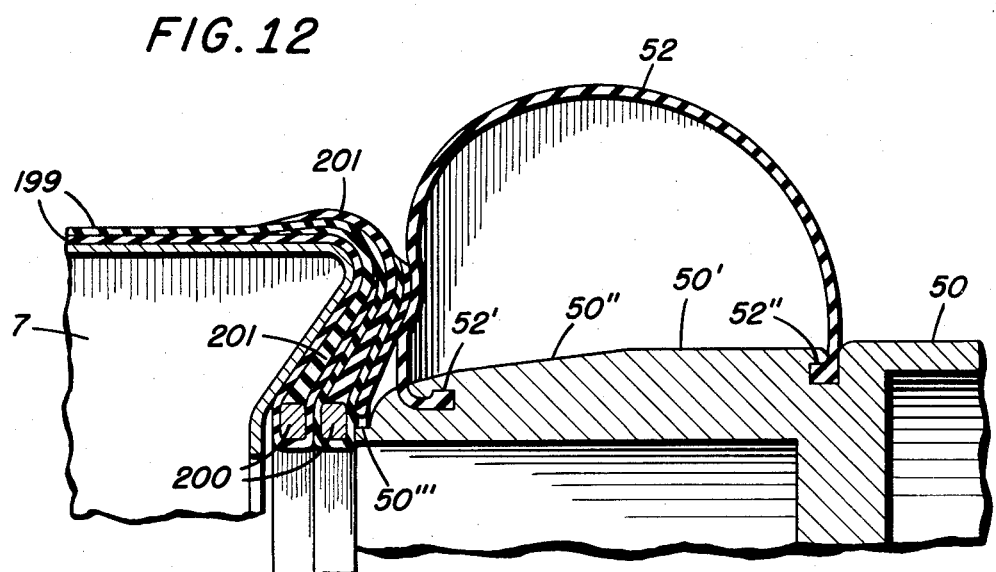
FIG. 12 is a partial vertical sectional view illustrating relationships of certain components in the application of the metallic chafer on the right side of the building drum.

According to the specifications established for the tire to be manufactured, additional units of carcass plies and bead cores can be applied in the above-described manner, as shown in FIG. 12. Also, a metallic chafer can be applied at each side of the tire, as shown, by means of membranes 183 and 52 as described above in regard to the application of the fillers 201 with reference to FIGS. 9 and 10.

Figure 3:
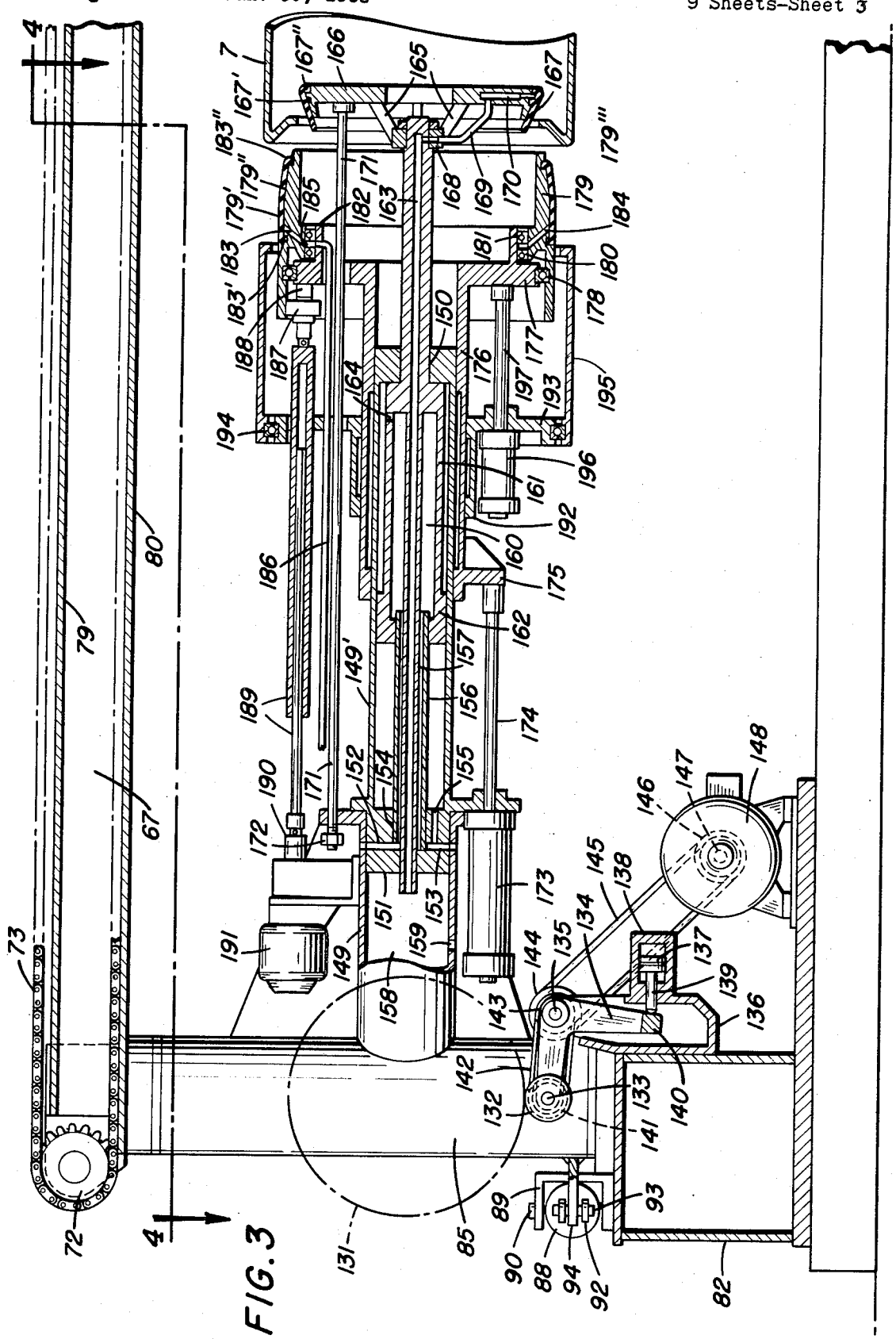
FIG. 3 is a partial sectional view, similar to FIG. 2, but showing a device for performing additional operations on the carcass plies, the device of FIG. 2 being diagrammatically indicated with a circle.

After having again separated the bells 179 and 50 from the drum 7, as described above, compressed fluid is admitted from the end of cylinder 196 directed towards the drum 7 and, since the bell 179 can no longer move away from the drum due to the fact that the piston sliding in the cylinder 173 has reached the end of its stroke, it is possible to move the bell 195 towards the drum 7, since bell 195 is assembled on the flange 193, to which is secured cylinder 196 as can be seen from FIG. 3.

At the same time as can be seen from FIG. 1 compressed fluid is admitted to cylinder 61 from its end opposite that directed towards the drum 7 in order to move bell 66 towards the drum by means of the stem 62, the hub 64 and its flange 63, the bell 66 being assembled on said flange. In this way a continuous, substantially cylindrical surface is obtained, which is formed by the bells 195 and 66 and by the outer surface of the plies applied on the drum 7.

Other elements forming the finished tire, such as the strip for wrapping the tire beads and the tire sidewalls can be applied in a flat position in part on said bells and in part on said plies. These elements are then stitched to the carcass by means of the above-indicated stitching device by again rotating the drum 7 by means of motor 16. If the built up carcass serves for a conventional tire, the tread may also be applied in the flat position. If the carcass is used for a radial tire, it is removed before applying the tread, in which case the tread, together with the cincture, is applied on the carcass after the shaping of this latter on another machine.

To remove the carcass from the building drum 7, the latter is collapsed by again inflating the air bags 18 and 29 (FIG. 1) in such a manner that they engage respectively against the annular lug 17 and the bell 30, and compressed fluid is admitted into the upper end of cylinder 26 and is discharged from the lower end so as to rotate the crank 22, and therefore the hub 8, through an angle equal, but in an opposite direction, to that direction corresponding to the expansion of the drum, as described above.

The principle of the invention being not affected, the details of the method and of the apparatus may be widely varied with respect to what is described and illustrated only by way of non-limiting example, without departing from the scope of the invention itself.

For example, the turning of the plies inside out in the form of a continuous ring from the cylindrical support onto the building drum can be carried out without expanding said plies, especially if the cords contained therein are more spaced from one another. Also, the cylindrical support must not necessarily have a diameter smaller than that of the drum. Further, the means for carrying out said turning inside out can be optionally provided with expansible membranes, and the axial displacement of the latter can be carried out with means other than the rigid cylinder represented in the figures, such as, for example, with any known means for turning up the ply edges about the bead cores.

The drum can be of the inflatable type and constituted by two circular rigid sidewalls and by an expansible membrane, whose edges are anchored to said sidewalls, in which case if the turning up operation is carried out by means of the expansion or the turning over of membranes, the drum must be able to withstand considerably high pressures (of the order of several atmospheres) exerted from the outside to the inside of the membrane.

Of course, the device for turning the plies inside out on the building drum, as well as the other device, which alternatively occupies the position of the former, may be adapted to slide in a transverse direction with respect to the axis of the drum, instead of being rotatably assembled about a vertical column, as described above.

Moreover, the various devices disposed at the two sides of the drum can be independent or associated with one another in a different manner in order to carry out the movements necessary to their function.

It is apparent from the above descrition that the present invention has the following considerable advantages, both from an economical point of view and from a standpoint of accuracy of the tire manufacture.

For example, the present invention eliminates the various handlings of the plies, which were in use up to the present time and which involved a longer time for the manufacture of the tire and a deformation of the plies, with a consequent irregular displacement of their cords, which affected, in a negative sense, the behavior of the tire in operation.

In addition, the present apparatus eliminates both the device for the preparation of the plies in the form of a continuous ring and the worker for operating said device, since the device for applying the plies on the building drum can also be used for preparing the plies in the form of a ring. Thus, for this work it is possible to exploit the free time of the worker making the tire.

Further, by means of the apparatus forming the object of the present invention, it is also possible to facilitate the application of the bead fillers and of the metal chafers which heretofore were applied by hand with a considerable difficulty for the worker, since these heavy elements had to be applied directly on the drum shoulders which formed an inclined annular surface having a large variation of diameter. In fact, in the apparatus of the present invention, the fillers are paid off from a roller and are rewound up directly in flat position on suitable devices, whose outer surface corresponds exactly to the surface of said fillers, and the fillers are maintained in this position until they are applied on the building drum.

Also, the apparatus of the present invention for turning up the ply edges is particularly efficient since it has a frusto conical peripheral band whose generatrices are convergent away from the drum midline; and the membrane, secured to said band, may be stiffened by placing its inside in communication with a vacuum pump. These features faciliate the removal of the apparatus for turning up the ply edges from the inside of the building drum while the edges are turned towards the axis of the latter. Moreover, the frusto conical shape of the band reduces the axial thrusts against the drum deriving from the inflation of the membrane secured to said band, and therefore the ply edges adhere to the outer surface comprised between the two bead cores in a manner sufficient to remain turned up before being stitched, but not in such a manner as to prevent the discharge of the air trapped in their loops during the subsequent stitching operation.

Of course, variations of the specific construction and arrangement of apparatus herein disclosed can be made by those skilled in the art without departing from the invention as defined in the appended claims.

We claim:

1. An apparatus for the manufacture of pneumatic tires comprising a building drum, a first rigid cylinder for carrying a continuous ring of at least one carcass ply on its surface, rigid annular means coaxially mounted with said drum and said cylinder and substantially the same diameter of said cylinder, slidably mounted at one end of said cylinder for independent axial movement toward and away from said one end to clamp one edge of said ring to a portion of said surface, means to move said cylinder and said rigid means laterally with reference to the axis of said drum into and out of coaxial relationship with one side of said drum with said clamping means adjacent said one side of said drum and means to transfer said ring from said cylinder to said drum by folding said ring over itself, said one edge of said ring remaining clamped to said surface portion, in such a manner that the surface of the ring which faces toward said cylinder surface becomes the outer surface of said ring on said drum.

2. An apparatus as in claim 1 wherein said transfer means comprises a tubular membrane covering the outer surface of said rigid cylinder and secured to said surface at said one end of said cylinder, said membrane being radially expansible and at least partially folded upon itself, said ring being carried on said at least partially folded membrane, and further comprising means to admit and discharge compressed fluid to and from the inside of said membrane, the outside diameter of said at least partially folded membrane being substantially equal to the outer diameter of said rigid clamping means.

3. An apparatus as in claim 1, said lateral moving means comprising a pivotal support member on which said first rigid cylinder is slidably mounted and means on said support member to cause sliding of said first rigid cylinder on said support in two directions when said cylinder and rigid means have been moved laterally into coaxial relationship with said drum.

4. An apparatus as in claim 3, said rigid means comprising a coaxial bell having a frusto conical surface opposing said surface portion of said first rigid cylinder, said bell having a diameter slightly greater than that of said first rigid cylinder, and further comprising means to effect relative axial displacement between said bell and said first rigid cylinder.

5. An apparatus as in claim 2, in which said membrane is provided with inextensible longitudinal reinforcements.

6. An apparatus as in claim 1, further comprising means to rotate said first rigid cylinder about its own axis.

7. An apparatus as in claim 3, further comprising an adjustable device to vary the sliding of said first rigid cylinder of said support member in accordance with said ring width.

8. An apparatus as in claim 3 further comprising means to rotate said support member laterally about an axis from a position in which said first rigid cylinder is substantially coaxial with said drum, to a position wherein said first rigid cylinder axis extends at least 90° with respect to said drum axis.

9. An apparatus as in claim 4 wherein said first rigid cylinder has, at its surface portion opposing said bell, an annular frusto conical surface parallel to said corresponding annular frusto conical surface provided on the end of said bell and directed towards said first rigid cylinder, the generatrices of said frusto conical surfaces being convergent towards said drum midline, said surfaces comprising said clamping means.

10. An apparatus as in claim 4 wherein said bell is also assembled on said support member to move coaxially with said first rigid cylinder and independently thereof.

11. An apparatus as in claim 6, in which said first rigid cylinder is provided at the end opposite said rigid means with a crown; and wherein said means to rotate said first rigid cylinder comprises a roller adapted to selectively engage said crown, means for engaging and disengaging said roller with respect to the crown, and means for controlling the rotation of said roller.

12. An apparatus as in claim 1 further comprising a turn up device coaxially positionable within each side of said drum and adapted to turn up the edges of the carcass plies about the bead cores of the tire, one of said devices being displaceably positioned on the axis of said drum, the other device being pivotally moveable into coaxial relationship with said drum, separate means to displace each said turn up device between a position inside said drum to a position outside said drum, each turn up device having a peripheral frusto conical band whose generatrices are convergent away from the drum midline, an expansible tubular membrane being secured to each of said bands, and means for admitting compressed fluid between said peripheral bands and their corresponding membranes.

13. An apparatus as in claim 12, wherein each of the membranes secured to said peripheral bands is folded upon itself and is provided with inextensible reinforcements disposed along the generatrices of its corresponding band.

14. An apparatus as in claim 13, further comprising means for connecting the inside of said membranes secured to said peripheral bands with a vacuum pump.

15. An apparatus as in claim 12, further comprising means to secure each of said turn up devices in a predetermined position outside said drum.

16. An apparatus as in claim 1, further comprising a first bell disposed at each side of the drum, each of said first bells having a frusto conical surface formed on the portion of its outer band which is nearest to said drum, the generatrices of said frusto conical surfaces being convergent towards the midline of said drum; an expansible membrane having thickened edges secured to each of said bands; means for moving said first bells to and from said drum; means for admitting compressed fluid between the peripheral band of each of said first bells and its corresponding membrane, and means for creating a depression between each of said first bells and its corresponding membrane.

17. An apparatus as in claim 16, further comprising a plurality of reinforcing members provided in the thickened edges of the expansible membranes associated with said bells and extending to the contiguous portions of said latter membranes.

18. An apparatus as in claim 16, wherein each of said first bells is provided with an annular supporting element for a bead core located over the smaller diameter of its frusto conical surface.

19. An apparatus as in claim 16, further comprising means to rotate each of said first bells about its own axis.

20. An apparatus as in claim 16, further comprising a second bell disposed at each side of said drum, each of said second bells having a diameter greater than that of said first bells and substantially equal to that of said drum; and means for moving each of said second bells to and from said drum.

21. An apparatus as in claim 20, wherein at least one of said second bells is adapted to move to and from said drum both together with its corresponding first bell and independently thereof.

22. An apparatus as in claim 20, wherein each of said second bells has a cylindrical form and is adapted to idle about its own axis.

23. An apparatus as in claim 1, further comprising an additional rigid cylinder coaxial with said drum and having a diameter greater than that of the latter, said additional rigid cylinder being telescopically displaceable at least from said first rigid cylinder to said drum, and vice versa.

24. An apparatus as in claim 23 further comprising a longitudinal beam mounted above and parallel to the axis of said drum and extending on both sides thereof, said additional rigid cylinder being movably mounted on said beam axially encompassing said drum in uniform peripheral spacing therefrom and means to move said additional rigid cylinder back and forth along said beam in telescoping relationship with said drum and said first rigid cylinder.

25. An apparatus as in claim 1, further comprising supply means for the supply of carcass plies and at least one rubber sheet to said first rigid cylinder, said supply means being disposed in proximity to said first rigid cylinder and extending parallel to said first rigid cylinder in at least one position of the latter.

26. An apparatus for the manufacture of pneumatic tires comprising a building drum, a first rigid cylinder for carrying a continuous ring of at least one carcass ply on its surface, said cylinder including adjustable rigid annular means at one end to clamp one edge of said ring to said surface, means to move said first rigid cylinder laterally into and out of coaxial relationship to one side of said drum with said clamping means adjacent said one side and means to transfer said ring from said cylinder surface to said drum, said one edge remaining clamped to said surface, in such a manner that the surface of the ring which faces toward said cylinder surface becomes the outer surface of said ring on said drum, a turn up device coaxially positionable within each side of said drum and adapted to turn up the edges of the carcass plies about the bead cores of the tire, one of said devices being displaceably positioned on the axis of said drum, the other device being pivotally moveable into coaxial relationship with said drum, separate means to displace each said turn up device between a position inside said drum to a position outside said drum, each turn up device having a peripheral frusto conical band whose generatrices are convergent away from the drum midline, and expansible tubular membrane being secured to each of said bands, and means for admitting compressed fluid between said peripheral bands and their corresponding membranes.

27. An apparatus as in claim 26, in which said first rigid cylinder is provided at the end opposite the rigid means with a crown and with means to rotate said first rigid cylinder comprising a roller adapted to selectively engage said crown, means for engaging and disengaging said roller with respect to the crown, and means for controlling the rotation of said roller.

28. An apparatus as in claim 26, wherein each of the membranes secured to said peripheral bands is folded upon itself and is provided with inextensible reinforcements disposed along the generatrices of its corresponding band.

29. An apparatus as in claim 28, further comprising means for connecting the inside of said membranes secured to said peripheral bands with a vacuum pump.

30. An apparatus as in claim 26, further comprising means to secure each of said turn up devices in a predetermined position outside said drum.

31. An apparatus as in claim 26, further comprising a first bell disposed at each side of the drum, each of said first bells having a frusto conical surface formed on the portion of its outer band which is nearest to said drum, the generatrices of said frusto conical surfaces being convergent towards the midline of said drum; an expansible membrane having thickened edges secured to each of said bands; means for moving said first bells to and from said drum; means for admitting compressed fluid between the peripheral band of each of said first bells and its corresponding membrane, and means for creating a depression between each of said first bells and its corresponding membrane.

32. An apparatus as in claim 31, further comprising a plurality of reinforcing members provided in the thickened edges of the expansible membranes associated with said bells and extending to the contiguous portions of said latter membranes.

33. An apparatus as in claim 31, wherein each of said first bells is provided with an annular supporting element for a bead core located over the smaller diameter of its frusto conical surface.

34. An apparatus as in claim 31, further comprising means to rotate each of said first bells about its own axis.

35. An apparatus as in claim 31, further comprising a second bell disposed at each side of said drum, each of said second bells having a diameter greater than that of said first bells and substantially equal to that of said drum; and means for moving each of said second bells to and from said drum.

36. An apparatus as in claim 35, wherein at least one of said second bells is adapted to move to and from said drum both together with its corresponding first bell and independently thereof.

37. An apparatus as in claim 36, wherein each of said second bells has a cylindrical form and is adapted to idle about its own axis.

38. An apparatus as in claim 31, further comprising a common support means on each side of said drum for said turn up devices and said first bells.

39. An apparatus as in claim 38, wherein one of said common support means is mounted on a pivotal support member for rotation in two directions about an axis from a position in which said common support means is substantially aligned with said drum to a position corresponding to a rotation through at least 90° with respect to said drum.

40. An apparatus as in claim 39, wherein said common support member is mounted on and extends at right angle to the pivotal support member on which said first rigid cylinder is mounted.

41. An apparatus as in claim 40, wherein said first rigid cylinder is slidably mounted on one said common support means and means are provided on said pivotal support member to cause sliding of said first rigid cylinder on said support in two directions when said cylinder and rigid means have been moved laterally into coaxial relationship with said drum.

42. An apparatus as in claim 41, further comprising an adjustable device to vary the sliding of said first rigid cylinder on said support member in accordance with said ring width.

43. An apparatus as in claim 26, further comprising an additional rigid cylinder coaxial with said drum and having a diameter greater than that of the latter, said additional rigid cylinder being telescopically displaceable at least from said first rigid cylinder to said drum, and vice versa.

44. An apparatus as in claim 43, further comprising a longitudinal beam mounted above and parallel to the axis of said drum and extending on both sides thereof, said additional rigid cylinder being movably mounted on said beam axially encòmpassing said drum in uniform peripheral spacing therefrom and means to move said additional rigid cylinder back and forth along said beam in telescoping relationship with said drum and said first rigid cylinder.

45. An apparatus as in claim 26, further comprising supply means for the supply of carcass plies and at least one rubber sheet to said first rigid cylinder, said supply means being disposed in proximity to said first rigid cylinder and extending parallel to said first rigid cylinder in at least one position of the latter.

46. Apparatus for the manufacture of pneumatic tire carcasses comprising a frame having two spaced upright members and a beam interconnecting the upper ends thereof; rotatable shaft means mounted in one of said uprights and means for rotation of said shaft means; a building drum mounted on said shaft means; a tubular element mounted at one end in said one upright and extending axially along said shaft means, said tubular element carrying at its other end a first expansible means slidable along said shaft means from a coaxial position within one of the sides of said drum to a coaxial position without said one side of said drum for folding the one edge of a carcass ply around a bead core, a second expansible means on said end of said tubular element encompassing said first expansible means and separately slidable toward and away from said one side of said drum in coaxial relationship for applying a filler strip to said ply above said core; a pivotal shaft positioned around said other upright, said pivot shaft carrying two support arms extending at a right angle to each other in the plane of the axis of the building drum; one of said support arms having mounted thereon a first rigid cylinder slidable toward and away from the other of the sides of said drum in coaxial relationship, said first rigid cylinder having thereon an expansible inextensible surface adapted to receive and carry a continuous ring of at least one carcass ply for transfer to said drum, said rigid cylinder including means on the end adjacent said drum to clamp said ply to said expansible surface; the other of said support arms having mounted thereon a first expansible means slidably arranged for movement from a coaxial position within the other side of said drum for folding the other edge of a carcass ply around a bead core placed thereon; a second expansible means coaxial with and encompassing said first expansible means arranged on said other support arm and adapted to sliding movement to and from said other side of said drum both together with the movement of said first expansible means and independently thereof for applying a filler strip above said bead core; means to rotate said pivotal shaft about said upright in either direction from a position in which one of said support arms is coaxial with said drum to a position in which the other of said support arms is coaxial with said drum; a second rigid cylinder movably mounted on said beam axially encompassing said drum in uniform peripheral spacing therefrom and means to move said second rigid cylinder back and forth along said beam in telescoping relationship with said drum and said first rigid cylinder; and means for supplying at least one carcass ply to the expansible surface of said cylinder, said supply means being disposed in proximity to said first rigid cylinder and extending parallel thereto in at least one pivotal position of said first rigid cylinder.

References Cited
UNITED STATES PATENTS

| | | | |
|---|---|---|---|
| 2,440,662 | 4/1948 | Frazier | 156—401 |
| 3,016,084 | 1/1962 | Niclas et al. | 156—394 X |
| 3,070,478 | 12/1962 | Riddle | 156—394 X |
| 3,127,294 | 3/1964 | Porter | 156—401 X |
| 3,272,677 | 9/1966 | Black | 156—401 |

ROBERT F. BURNETT, Primary Examiner

A. B. COSBY, Assistant Examiner

U.S. Cl. X.R.

156—126, 132, 133, 135, 403, 414